(12) United States Patent  
Gat

(10) Patent No.: US 7,290,123 B2
(45) Date of Patent: Oct. 30, 2007

(54) SYSTEM, DEVICE AND METHOD OF MAINTAINING IN AN ARRAY LOOP ITERATION DATA RELATED TO BRANCH ENTRIES OF A LOOP DETECTOR

(75) Inventor: Tal Gat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 10/849,025

(22) Filed: May 20, 2004

(65) Prior Publication Data

US 2005/0262333 A1 Nov. 24, 2005

(51) Int. Cl.
G06F 9/42 (2006.01)

(52) U.S. Cl. ........................................ 712/241; 712/18

(58) Field of Classification Search ................ 712/241, 712/18
See application file for complete search history.

(56) References Cited

U.S. PATENT DOCUMENTS 4,727,483 A * 2/1988 Saxe .......................... 712/241
5,898,865 A * 4/1999 Mahalingaiah ............... 712/239
6,438,682 B1 * 8/2002 Morris et al. ................ 712/241
6,629,238 B1 * 9/2003 Arora et al. ................. 712/241

OTHER PUBLICATIONS

Inside the Intel Itanium 2 Processor, Jul. 2002, Hewlett Packard.*
Itanium Processor Microarchitecture Reference for Software Optimization, Mar. 2000, Intel.*

* cited by examiner

Primary Examiner—Donald Sparks
Assistant Examiner—Vincent Lai
(74) Attorney, Agent, or Firm—Pearl Cohen Zedek Latzer, LLP

(57) ABSTRACT

A loop detector with an array to store a counter of loop iterations, where the number of entries in the array may be, for example, smaller than the number of entries in the loop detector. Entries in the array may, for example, be associated with more than one entry in the loop detector. The array may store, for example, a counter of speculative iterations of a loop or, for example, a number of actual iterations of a loop.

21 Claims, 3 Drawing Sheets

SYSTEM, DEVICE AND METHOD OF MAINTAINING IN AN ARRAY LOOP ITERATION DATA RELATED TO BRANCH ENTRIES OF A LOOP DETECTOR

BACKGROUND OF THE INVENTION

A branch prediction unit may include or be associated with a loop detector that may, for example, detect loop behavior in a branch and that may track the number of iterations of such loop that are executed. A loop detector may include, for example, 128 entries. Other numbers of entries may be used. Entries in a loop detector may include an area to store a tag of a branch. Entries in a loop detector may also include a real counter, that may be in the form of a data storage area to store a counter of the number of actual iterations of the loop, a speculative counter, that may be in the form of an area to store a speculative counter of the number of iterations of the loop, and a max counter, that may be in the form of an area to store a predicted maximum number of iterations of a branch that are likely to be executed in a loop.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention, but the scope of the invention is not limited to the examples given. Features described with respect to one embodiment may be included in other embodiments though not described therein.

Unless specifically stated otherwise, as apparent from the following discussions, it is appreciated that throughout the specification, discussions utilizing terms such as "processing," "computing," "calculating," "determining," or the like, refer to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes presented herein are not inherently related to any particular computer, processing device, article or other apparatus. A desired structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein. Descriptions in this application of items in one embodiment may be included in other embodiments even though they are not described in such other embodiments.

Figure 1:
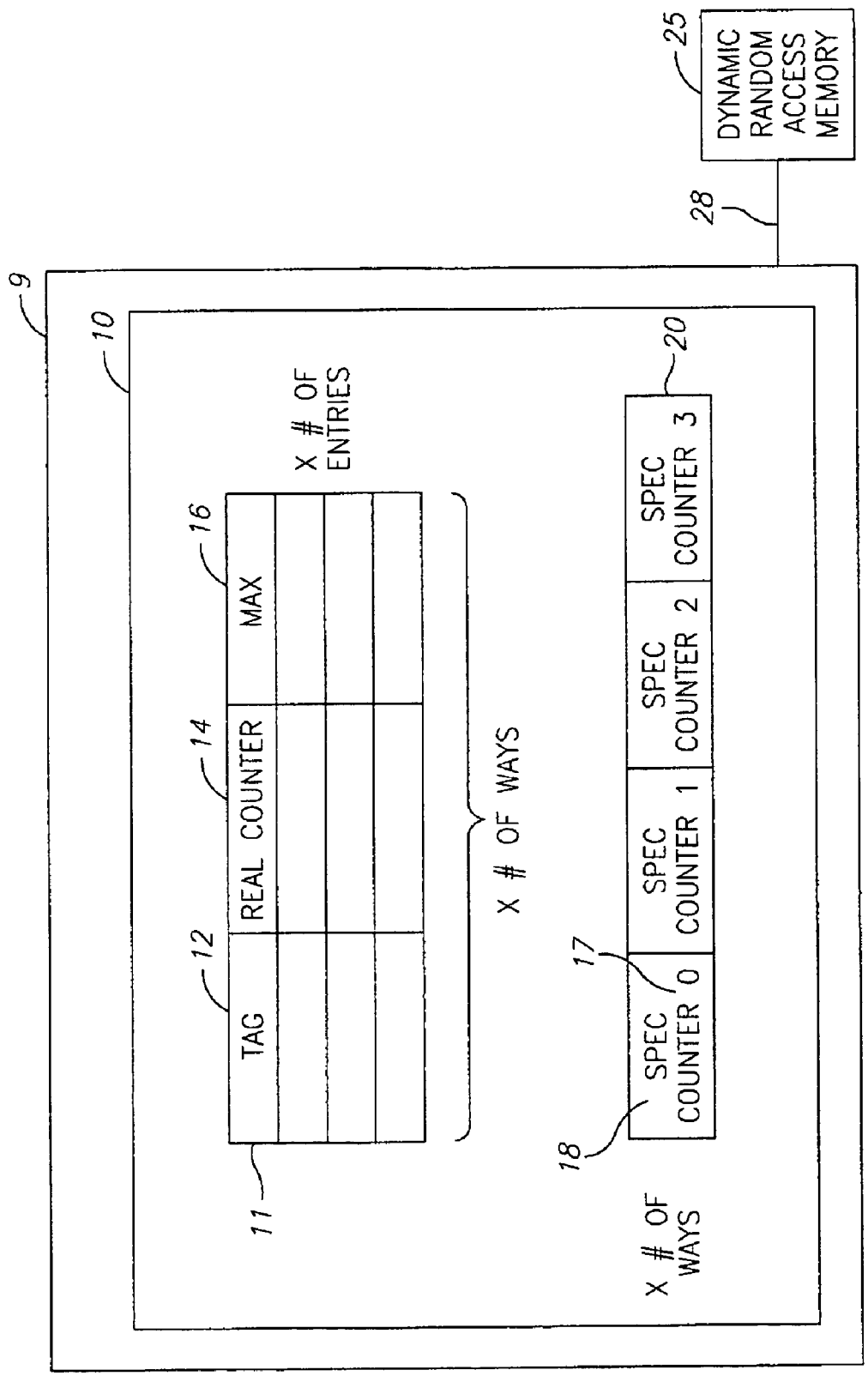
FIG. 1 is a schematic diagram of certain components of a loop detector including a speculative counter array in accordance with an exemplary embodiment of the invention.

Reference is made to FIG. 1, a schematic diagram of certain components of a loop detector including a speculative counter array in accordance with an exemplary embodiment of the invention. FIG. 1 shows a processor 9, that may include among other components a loop detector 10. Loop detector 10 may include, for example, a series or set (when used herein set may include one unit) of numbered entries 11. The numbered entries 11 may correspond to the several least significant bits of an address of a branch such as, for example, the 8 least significant bits of the address of a branch. Other coding or bits for entries may be used. In some embodiments, an entry 11 may have a number of ways such as, for example, two ways. In some embodiments, a loop detector 10 may include, for example, 128 entries 11, where entries 11 haven for example, two ways. In such case, for example, loop detector 10 may store data relating to 256 branches. Other dimensions are possible. An entry 11 may include data storage space for storing a tag 12 including, for example, the several most significant bits of an address of a branch, a real counter 14 to track the number of iterations that are actually executed in a loop of such branch, and a max 16 counter, which may, for example, store the predicted maximum number of iterations that are likely to be executed in a loop of a particular branch. An entry 11 of a loop detector 10 may also include or store other information. In some embodiments, an entry 11 may include a tag 12 and a max counter 16, and may not include a real counter 14. In some embodiments, processor 9 may be operably connected by bus 28 to a mass data storage unit such as, for example, a dynamic random access memory chip 25, or another suitable memory device, including RAM, disk drives, etc.

Loop detector 10 may include or be operatively connected to or associated with one or more arrays 20 such as, for example, a fully associative array with, for example, four array entries 18. In some embodiments, a first way of array 20 may be associated with a particular way of the loop detector 10 such as, for example, way #0. A second way of array 20 may be associated with a second way of loop detector 10 such as, for example, way #1. Other kinds of arrays 20 may be used, other numbers of ways may be used, and other number of array entries 18 such as, for example, two array entries 18 in each way may be used. Array entries 18 may include data storage areas that may store a counter such as, for example, a speculative counter 17 to track the number of times that a branch was speculated or predicted to be executed in a loop. In some embodiments a counter may include a number of times that a branch was actually executed in a loop. The number of array entries 18 such as four or eight, may be fewer than the number of entries 11 in loop detector 10.

In operation, an entry 11 of a loop detector 10 may be allocated to a branch when, for example, such branch is predicted as having a strongly taken state, to indicate that such branch is part of a loop. The tag 12 of such branch may be stored in an entry 11 and a prediction of the number of times that the branch may or is likely to be executed as part of the loop may be stored in max counter 16. In some embodiments, a number of times that such branch has actually run in a particular loop may be stored in real counter 14, and real counter 14 may be incremented after an execution of the branch in a loop. If an execution of a branch in a loop is detected, an allocation of an array entry 18 in array 20 may be made for such looping branch by storing a tag of the looping branch in an entry 18 of array 20. A counter of, for example, the number of speculative executions of a branch in the loop may be initially set, for example, to 0 to indicate the first speculative prediction of the branch has now been made. In some embodiments, such as, for example, when there is a mis-prediction of an execution that causes a speculative counter to be voided, speculative counter 17 in an array entry 18 may be set to equal the number of iterations stored in real counter 14 for such looping branch. When a branch is executed or, for example, when a prediction of the execution of the branch is made, loop detector 10 may determine whether an array entry 18 has been allocated to the particular branch. If an array entry 18 has been allocated to the branch, such that there is a hit, the speculative counter 17 may be increased to reflect the execution of the branch. Speculative counter 17 may be updated speculatively at the time of the prediction. Real counter may be updated after execution of the branch.

In some embodiments, an array entry 18 may be allocated to a branch that is detected as being in a loop. In the event that all array entries 18 have been allocated to branches, and a further branch is predicted to be executed as part of a loop and therefore needs an allocation of an array entry 18, an array entry 18 for such further loop may be selected on the basis of, for example, the least recently used (LRU) array entry 18. Under this basis, the array entry 18 that has been least recently used or incremented may be allocated to count the executions of the branch in need of a speculative counter 17. Other basis of allocation for array entries 18 may be used.

Figure 2:
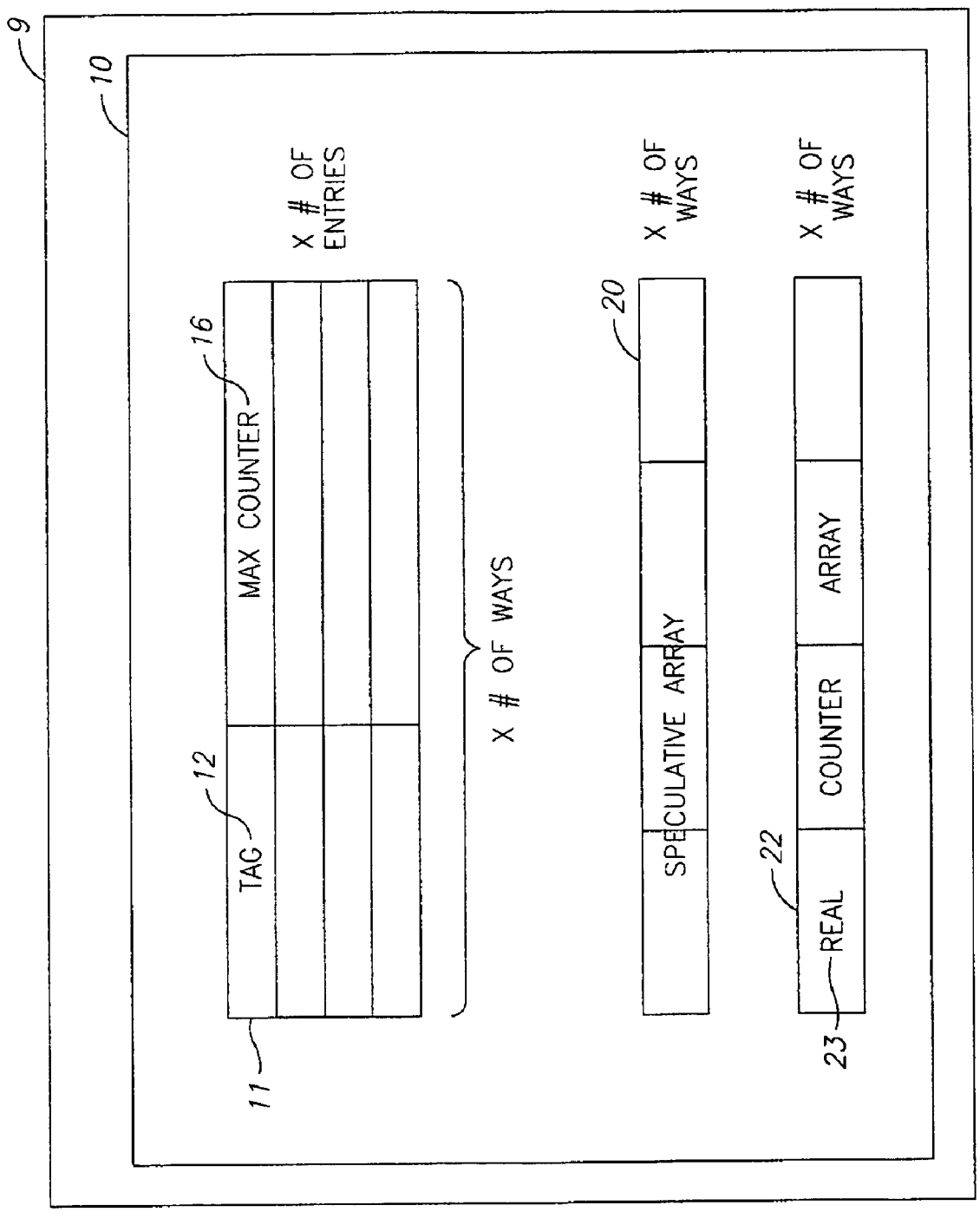
FIG. 2 is a schematic diagram of certain components of a loop detector and real counter array of a loop detector in accordance with an exemplary embodiment of the invention.

Reference is made to FIG. 2, a schematic diagram of certain components of a loop detector including a real counter array of a loop detector in accordance with an exemplary embodiment of the invention. In some embodiments, a loop detector 10 may include entries 11 that have data storage areas for a tag 12 and a max counter 16. Other data items may be stored. Loop detector 10 may also include two sets of arrays. A first array or set of arrays may be, or include, a speculative counter array 20 as described herein. A second array or set of arrays may be, or include, data storage areas for a real counter array 22 that may, for example, track or count the number of actual iterations of a branch that are executed as part of or in the course of a loop. A real counter array entry 23 may be allocated to a looping branch and the real counter array entry 23 may be incremented with each actual execution of the branch in a loop. The number of iterations of the branch may be compared with the number of iterations stored in the max counter 16 to, for example, determine when the loop may terminate. In some embodiments, when, for example, a branch predictor predicts a strongly taken state, or at other intervals, loop detector 11 may determine whether a real. counter array entry 23 has been allocated for the branch. If a real counter array entry 23 has been allocated for such branch, the real counter in such entry may be incremented when the branch is executed. If no real counter array entry 23 is available, an entry may be allocated using, for example, the LRU method or other methods as are described herein. Other methods of allocating a real counter entry 23 may be used.

Figure 3:
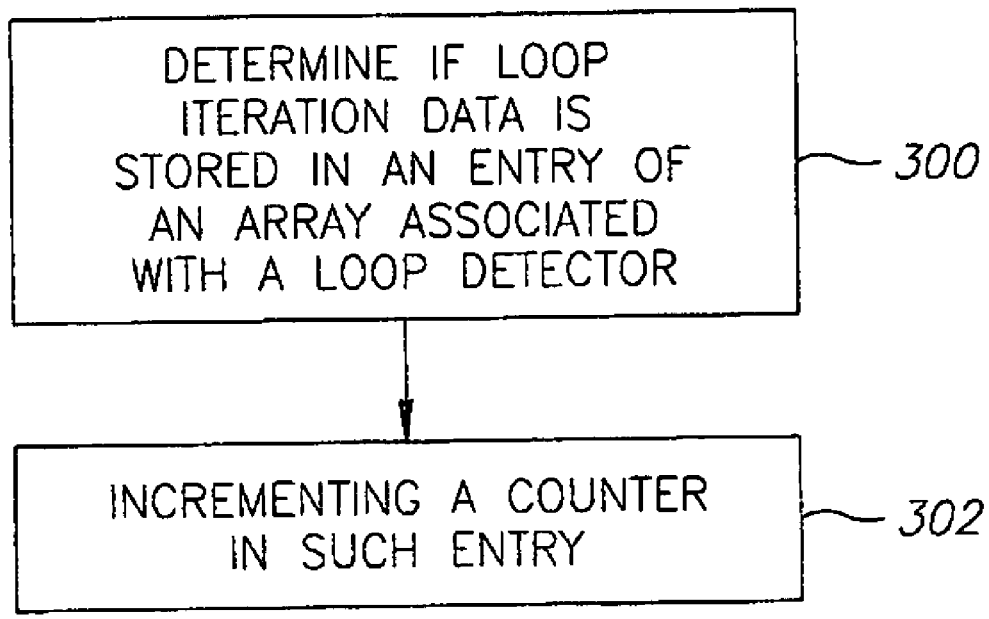
FIG. 3 is a flow chart of a method of incrementing a counter in an array to track iterations of a loop in accordance with an embodiment of the invention.

Reference is made to FIG. 3, a flow chart of a method of incrementing a counter in an array to track iterations of a loop in accordance with an embodiment of the invention. In block 300 a processor or another component of, for example, a computer system may determine whether loop iteration data about a particular branch is stored in an entry of an array that is associated with a loop detector. The number of entries in the array may be smaller than the number of entries in the loop detector. In block 302, a counter in an entry of such array may be incremented to reflect an iteration of the branch. In some embodiments, if no entry is found as allocated to the looping branch, an entry may be allocated in an array and the number of actual iterations of the branch that have been undertaken may be copied into an entry of a counter array that may be associated with such branch. If it is a speculative array, the number may be copied from the real counter array. If there is no array entry allocated to the looping branch, the counter may be initiated at 1 on the assumption that the loop is just beginning. Other operations or sets of operations may be used.

Figure 4:
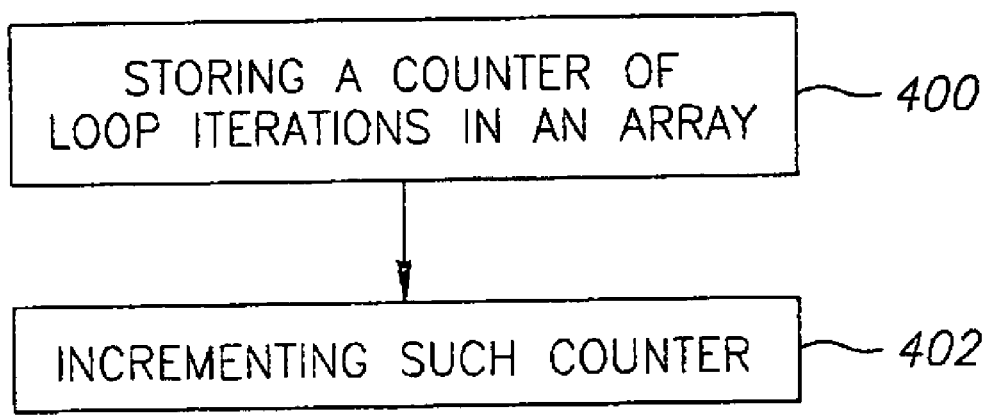
FIG. 4 is a flow chart of a method of storing loop operations in an array whose entries may be associated with more than one entry in a loop detector in accordance with an embodiment of the invention.

Reference is made to FIG. 4, a flow chart of a method of storing loop operations in an array whose entries may be associated with more than one entry in a loop detector in accordance with an embodiment of the invention. In block 400, a counter of loop iterations may be stored in an array, and entries in such array may be associated at various times with more than one entry in a loop detector. For example, an array entry may at one moment be allocated to a branch stored in, for example, entry #1 of a loop detector, and at another moment be allocated to a branch stored in, for example, entry #100 of a loop detector. In block 402, such counter may be incremented to reflect an iteration of a looping branch. Other operations or sets of operations may be used.

It will be appreciated by persons skilled in the art that the present invention is not limited to what has been particularly shown and described hereinabove. Alternate embodiments are contemplated which fall within the scope of the invention.

What is claimed is:

1. A loop detector comprising:
a set of branch entries to maintain data relating to a set of branches, respectively, wherein said set of branch entries includes a first number of entries; and
an array able to maintain a set of iteration entries, wherein said set of iteration entries includes a second number of entries smaller than said first number of entries,
wherein said loop detector is able to allocate at least one of said iteration entries to store loop iteration data relating to at least one branch entry of said set of branch entries, respectively.

2. The loop detector as in claim 1, wherein said array comprises a fully associative array.

3. The loop detector as in claim 1, wherein the loop iteration data relating to said at least one branch entry comprises at least one counter to count speculative iterations of said at least one branch.

4. The loop detector as in claim 1, wherein the loop iteration data relating to said at least one branch entry comprises at least one counter to count real iterations of said at least one branch.

5. A method of storing a counter of loop iterations, the method comprising:
- maintaining data relating to a set of branches in a set of respective branch entries of a loop detector, wherein said set of branch entries includes a first number of entries;
- determining if loop iteration data for a branch of said set of branches is stored in an entry of an array associated with said loop detector, said array able to maintain a second number of entries smaller than said first number of entries; and
- incrementing a counter in said entry.

6. The method as in claim 5, comprising copying a number of actual iterations of said branch into said entry.

7. The method as in claim 5, comprising allocating an iteration entry of said array based on a least recently used entry in said array.

8. The method as in claim 5, wherein incrementing said counter comprises incrementing a counter of actual iterations of said branch.

9. The method as in claim 5, wherein incrementing said counter comprises incrementing a counter of speculative iterations of said branch.

10. The method as in claim 5, wherein said array comprises a fully associative array.

11. A method of counting loop iterations comprising:
- maintaining data relating to a set of branches in a set of respective branch entries of a loop detector, wherein said set of branch entries includes a first number of entries; and
- allocating an entry of an array associated with said loop detector to store loop iteration data relating to a branch entry of said set of branch entries,
- wherein said array is able to maintain a set of iteration entries, said set of iteration entries includes a second number of entries smaller than said first number of entries.

12. The method as in claim 11, comprising storing in said entry a counter of speculative loop iterations of said branch.

13. The method as in claim 11, comprising storing in said entry a counter of real loop iterations of said branch.

14. The method as in claim 11, wherein said allocating comprises allocating said entry based on a least recently used entry in said array.

15. The method as in claim 11, wherein allocating the entry of said array comprises allocating an entry of a fully associative array.

16. A processor comprising a loop detector, said loop detector comprising:
- a set of branch entries to maintain data relating to a set of branches, respectively, wherein said set of branch entries includes a first number of entries; and
- an array able to maintain a set of iteration entries, wherein said set of iteration entries includes a second number of entries smaller than said first number of entries,
- wherein said loop detector is able to allocate at least one of said iteration entries to store loop iteration data relating to at least one branch entry of said set of branch entries, respectively.

17. The processor as in claim 16, wherein said loop iteration data comprises a speculative counter of loop iterations.

18. The loop detector as in claim 16, wherein said array comprises a fully associative array.

19. A system comprising:
- a dynamic random access memory unit; and
- a processor comprising a loop detector, said loop detector comprising:
  - a set of branch entries to maintain data relating to a set of branches, respectively, wherein said set of branch entries includes a first number of entries; and
  - an array able to maintain a set of iteration entries, wherein said set of iteration entries includes a second number of entries smaller than said first number of entries,
  - wherein said loop detector is able to allocate at least one of said iteration entries to store loop iteration data relating to at least one branch entry of said set of branch entries, respectively.

20. The system as in claim 19, wherein said loop iteration data comprises a counter to count speculative iterations of said branch.

21. The loop detector as in claim 19, wherein said loop iteration data comprises a counter to count real iterations of said branch.

* * * * *